US008929313B2

(12) United States Patent
Arnott et al.

(10) Patent No.: US 8,929,313 B2
(45) Date of Patent: Jan. 6, 2015

(54) RESOURCE ALLOCATION

(75) Inventors: Robert Arnott, London (GB); Sherif Mekhail, London (GB)

(73) Assignee: NEC Corporation, Tokyo (JP)

( * ) Notice: Subject to any disclaimer, the term of this patent is extended or adjusted under 35 U.S.C. 154(b) by 234 days.

(21) Appl. No.: 13/515,109

(22) PCT Filed: Dec. 21, 2010

(86) PCT No.: PCT/JP2010/073663
§ 371 (c)(1),
(2), (4) Date: Jun. 11, 2012

(87) PCT Pub. No.: WO2011/078392
PCT Pub. Date: Jun. 30, 2011

(65) Prior Publication Data
US 2012/0287881 A1    Nov. 15, 2012

(30) Foreign Application Priority Data
Dec. 23, 2009 (GB) .................................. 0922515.2

(51) Int. Cl.
H04W 4/00      (2009.01)
H04W 72/08     (2009.01)
H04L 5/00      (2006.01)
H04W 72/04     (2009.01)

(52) U.S. Cl.
CPC ........... *H04W 72/085* (2013.01); *H04L 5/0039* (2013.01); *H04L 5/0007* (2013.01); *H04L 5/006* (2013.01); *H04L 5/008* (2013.01); *H04L 5/0085* (2013.01); *H04W 72/042* (2013.01)
USPC ........................................................ 370/329

(58) Field of Classification Search
None
See application file for complete search history.

(56) References Cited

U.S. PATENT DOCUMENTS

| 7,020,110 | B2 | 3/2006 | Walton et al. |
| 7,542,441 | B2 | 6/2009 | Choi et al. |
| 8,428,019 | B2 | 4/2013 | Miki et al. |
| 8,699,443 | B2 | 4/2014 | Miki et al. |
| 2008/0219219 | A1* | 9/2008 | Sartori et al. .................. 370/335 |
| 2008/0232240 | A1* | 9/2008 | Baum et al. .................... 370/210 |
| 2008/0240030 | A1* | 10/2008 | Kolding et al. ............... 370/329 |
| 2009/0175231 | A1 | 7/2009 | Seo et al. |
| 2009/0232062 | A1 | 9/2009 | Higuchi et al. |

(Continued)

FOREIGN PATENT DOCUMENTS

| CN | 1636346 A | 7/2005 |
| CN | 1713561 A | 12/2005 |

(Continued)

OTHER PUBLICATIONS

International Search Report in PCT/JP2010/073663 dated May 25, 2011(English Translation Thereof).

(Continued)

*Primary Examiner* — Chirag Shah
*Assistant Examiner* — Jenkey Van
(74) *Attorney, Agent, or Firm* — McGinn IP Law Group, PLLC

(57) ABSTRACT

A mobile telecommunications system is described in which a base station allocates each mobile telephone a plurality of physical resource blocks for use in transmitting uplink data. A novel algorithm is described for the operation of the base station scheduler to perform this allocation in a computationally efficient manner.

10 Claims, 7 Drawing Sheets

(56) References Cited

U.S. PATENT DOCUMENTS

| | | |
|---|---|---|
| 2009/0310475 A1 | 12/2009 | Seo et al. |
| 2009/0310476 A1 | 12/2009 | Seo et al. |
| 2010/0027481 A1 | 2/2010 | Lindh et al. |
| 2010/0195612 A1 | 8/2010 | Seo et al. |
| 2010/0322182 A1 | 12/2010 | Seo et al. |
| 2010/0329199 A1 | 12/2010 | Liu et al. |
| 2011/0009142 A1 | 1/2011 | Higuchi |
| 2011/0044270 A1 | 2/2011 | Seo et al. |
| 2011/0058526 A1 | 3/2011 | Seo et al. |
| 2011/0134856 A1 | 6/2011 | Seo et al. |
| 2011/0134857 A1 | 6/2011 | Seo et al. |
| 2011/0134858 A1 | 6/2011 | Seo et al. |
| 2011/0275399 A1 | 11/2011 | Englund et al. |
| 2012/0008584 A1 | 1/2012 | Higuchi et al. |
| 2012/0020321 A1 | 1/2012 | Higuchi et al. |

FOREIGN PATENT DOCUMENTS

| | | |
|---|---|---|
| EP | 2077650 A2 | 7/2009 |
| EP | 2237456 A1 | 10/2010 |
| JP | 2009-273181 A | 11/2009 |
| WO | WO2009/022297 A2 | 2/2009 |
| WO | WO 2009/022706 A1 | 2/2009 |
| WO | WO2009/093489 A1 | 7/2009 |
| WO | WO2009/116489 A1 | 9/2009 |
| WO | WO2009/136825 A1 | 11/2009 |

OTHER PUBLICATIONS

3GPP TS 36.211 V8.0.0. (Sep. 2007), Technical Specification, $3^{rd}$ Generation Partnership Project; Technical Specification Group Radio Access Network; Universal Terrestrial Radio Access (E-UTRA) Physical channels and modulation (Release 8).

3GPP TS 36.213 V8.8.0. (Sep. 2009), Technical Specification, $3^{rd}$ Generation Partnership Project; Techincal Specification Group Radio Access Network; Evolved Universal Terrestrial Radio Access (E-UTRA) Physical layer procedures (Release 8).

Chinese Office Action and Search Report dated May 6, 2014 with a partial translation.

Japanese Office Action dated May 7, 2014, with English translation.

Luis Angel Maestro Ruiz de Temifio, "Channel-Aware Scheduling Algorithms for SC-FDMA in LTE Uplink", Personal, Indoor and Mobile Radio Communications, 2008, PIMRC 2008. IEEE $19^{th}$ International Symposium, Sep. 15, 2008, pp. 1-6.

Suk-Bok Lee, "Proportional Fair Frequency-Domain Packet Scheduling for 3GPP LTE Uplink", INFOCOM 2009, IEEE, Apr. 19, 2009, pp. 2611-2615.

* cited by examiner

RESOURCE ALLOCATION

TECHNICAL FIELD

The present invention relates to the allocation of resources within a communication system. The invention has particular, although not exclusive relevance to the allocation of physical resource blocks (PRBs) in a frequency division multiple access (FDMA) communication system.

BACKGROUND ART

Single carrier FDMA has been selected as the uplink multiple access scheme for the E-UTRA air interface currently being studied in 3GPP (which is a standard based collaboration looking at the future evolution of third generation mobile telecommunication systems). Under the E-UTRA system, a base station which communicates with a number of mobile telephones allocates the total amount of time/frequency resource (depending on bandwidth) among as many simultaneous users as possible, in order to enable efficient and fast link adaptation and to attain maximum multi-user diversity gain. The resource allocated to each mobile telephone is based on the instantaneous channel conditions between the mobile telephone and the base station and is informed through a control channel monitored by the mobile telephone.

A computationally efficient mechanism is required for allocating resources in the uplink in order to maximise the usage of the uplink.

DISCLOSURE OF INVENTION

According to one exemplary aspect, the present invention provides a method of determining a resource allocation from a set of resource blocks for a selected one of a plurality of user devices, the method comprising: obtaining a scheduling metric for each resource block and grouping the resource blocks into groups based on the obtained scheduling metrics, each group being associated with a user device; and determining the resource allocation for the selected user device using the resource blocks within a selected group of resource blocks associated with the selected user device; wherein the determining step comprises: a) identifying an initial resource block from the selected group, which initial resource block meets a defined characteristic (for example has a better scheduling metric than other resource blocks in the selected group); b) adding the initial resource block to a temporary set of resource blocks; and c) iteratively processing the resource blocks in the selected group by: i) selecting a neighbouring resource block from the selected group; ii) adding the selected resource block to the temporary set of resource blocks; and iii) determining if the resource blocks in the temporary set of resource blocks can meet a communications requirement for the user device. In this way, the search of the possible resource allocations can be performed without having to consider all possible combinations of resource blocks within the selected group.

The method may process all the groups associated with the selected user device in the above manner and then choose an allocation based on the results; or the method may process the groups of resource blocks in turn, stopping once an allocation is found that meets the communication requirements of the user device. If all the groups are processed in the above way, the temporary set of resource blocks that is selected may be based on the set of resource blocks that can meet the communications requirement of the user device in an optimal way, such as using the fewest resource blocks.

The iterative processing may be performed on the selected group until the determining step determines that the resource blocks in the temporary set of resource blocks can meet the communications requirement for the user device or until there are no more resource blocks within the selected group. If the iterative processing is performed on the selected group until there are no more resource blocks within the selected group, then the method may further comprise determining the combination of resource blocks within the group that provides the best communications capability.

The neighbouring resource block may be selected based on the neighbouring resource block that has the best associated scheduling metric.

Various different scheduling metrics may be used. In one exemplary embodiment, the scheduling metric represents the quality of the communications channel between the user device and the device (eg base station) with which the user device communicates. For example the Signal to Interference Ratio determined for the resource block may be used. Once the resource allocation is made, this can be signalled to the user device which can then use the allocation to control the communications it makes with the base station.

The method may include determining the scheduling metrics for the different resource blocks or the scheduling metrics may be provided by some other method or device.

According to another exemplary aspect, the present invention provides a communications apparatus operable to determine a resource allocation from a set of resource blocks for a selected one of a plurality of user devices in a communications system, the communications apparatus comprising: means for obtaining a scheduling metric for each resource block; means for grouping the resource blocks into groups based on the obtained scheduling metrics, each group being associated with a user device; and means for determining the resource allocation for the selected user device using the resource blocks within a selected group of resource blocks associated with the selected user device; wherein said determining means comprises: a) means for identifying an initial resource block from the selected group, which initial resource block has a better scheduling metric than other resource blocks in the selected group; b) means for adding the initial resource block to a temporary set of resource blocks; and c) means for iteratively processing the resource blocks in the selected group by: i) selecting a resource block from the resource blocks within the selected group that is adjacent the resource blocks in the temporary set of resource blocks; ii) adding the selected resource block to the temporary set of resource blocks; and iii) determining if the resource blocks in the temporary set of resource blocks can meet a communications requirement for the user device.

The communications apparatus may form part of a base station with which the user device is communicating.

The present invention also provides a communications system comprising a plurality of user devices and one or more base stations, wherein at least one of the one or more base stations comprises the above communications apparatus and is operable to determine resource allocations for each user device associated with the base station and wherein those associated user devices are operable to communicate with the base station using the resources allocated by the base station.

The invention also provides, for all methods disclosed, corresponding computer programs or computer program products for execution on corresponding user communications devices or network communications devices. The invention also provides user communications devices and network communications devices configured or operable to implement the methods and components thereof) and methods of updating these.

These and various other exemplary aspects of the invention will become apparent, from the following detailed description of an exemplary embodiment which is given by way of example only and which is described with reference to the accompanying drawings.

BEST MODE FOR CARRYING OUT THE INVENTION

Overview

Figure 1:
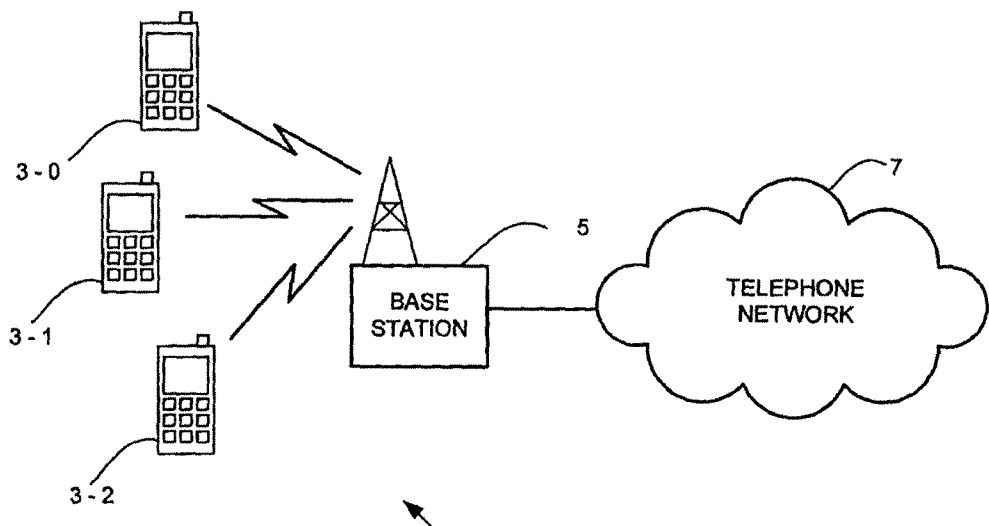
FIG. 1 schematically illustrates a communication system comprising a number of user mobile (cellular) telephones which communicate with a base station connected to the telephone network.

FIG. 1 schematically illustrates a mobile (cellular) telecommunication system 1 in which users of mobile telephones 3-0, 3-1, and 3-2 can communicate with other users (not shown) via a base station 5 and a telephone network 7. In this exemplary embodiment, the base station 5 uses an orthogonal frequency division multiple access (OFDMA) technique for transmitting the downlink data to the mobile telephones 3; and the mobile telephones 3 use a single carrier frequency division multiple access (FDMA) technique to transmit their uplink data to the base station 5. The base station 5 is responsible for allocating resources in both the uplink and the downlink for each mobile telephone 3. The present invention has specific relevance to the way in which the base station 5 determines the resource allocations for the mobile telephones 3 in the uplink.

LTE Sub-Frame Data Structure

Before discussing the specific ways in which the base station 5 allocates resources to the mobile telephones 3, a description will be given of the general frame structure agreed for LTE Release 8 (Rel 8) and therefore what these resources represent. As mentioned above, a SC-FDMA technique is used for the uplink to allow the mobile telephones 3 to transmit their data over the air interface to the base station 5. Different sub-carriers are allocated by the base station 5 (for a predetermined amount of time) to each mobile telephone 3 depending on the amount of data to be sent by the mobile telephone 3. These sub-carriers and temporal allocations are defined as physical resource blocks (PRBs) in the LTE specifications. PRBs thus have a time and frequency dimension. The base station 5 dynamically allocates PRBs for each device that it is serving and signals the allocations for each sub-frame (TTI) to each of the scheduled mobile telephones 3 in a control channel.

Figure 2:
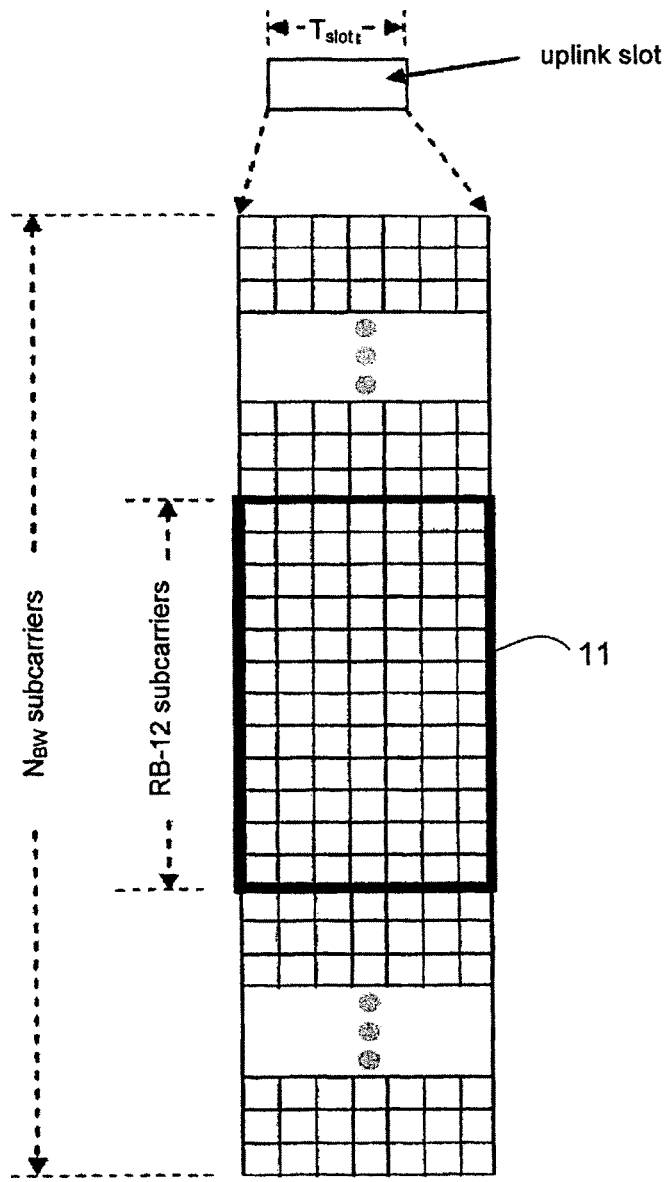
FIG. 2 schematically illustrates the way in which frequency subcarriers are divided into resource blocks and the way that a time slot is divided into a number of symbols.

The generic frame structure agreed for LTE Rel 8 communications over the air interface with the base station 5 is 10 msec long and comprises ten sub-frames of 1 msec duration (known as a Transmission Time Interval (TTI)). Each sub-frame or TTI comprises two slots of 0.5 msec duration. Each slot comprises either six or seven SC-FDMA symbols, depending on whether the normal or extended cyclic prefix (CP) is employed. The total number of available sub-carriers depends on the overall transmission bandwidth of the system. The LTE specifications define parameters for system bandwidths from 1.4 MHz to 20 MHz and one PRB is currently defined to comprise 12 consecutive subcarriers for one slot. A PRB over two slots is also defined by the LTE specifications as being the smallest element of resource allocation assigned by the base station scheduler. These sub-carriers are then modulated onto a component carrier to up-convert the signal to the desired transmission bandwidth. The transmitted uplink signal thus comprises $N_{BW}$ subcarriers for a duration of $N_{symb}$ SC-FDMA symbols and can be represented by a resource grid as illustrated in FIG. 2. Each box in the grid represents a single sub-carrier for one symbol period and is referred to as a resource element. As shown, each PRB 11 is formed from 12 consecutive sub-carriers and (in this case) seven symbols for each subcarrier; although in practice the same allocations are made in the second slot of each sub-frame as well.

Base Station

Figure 3:
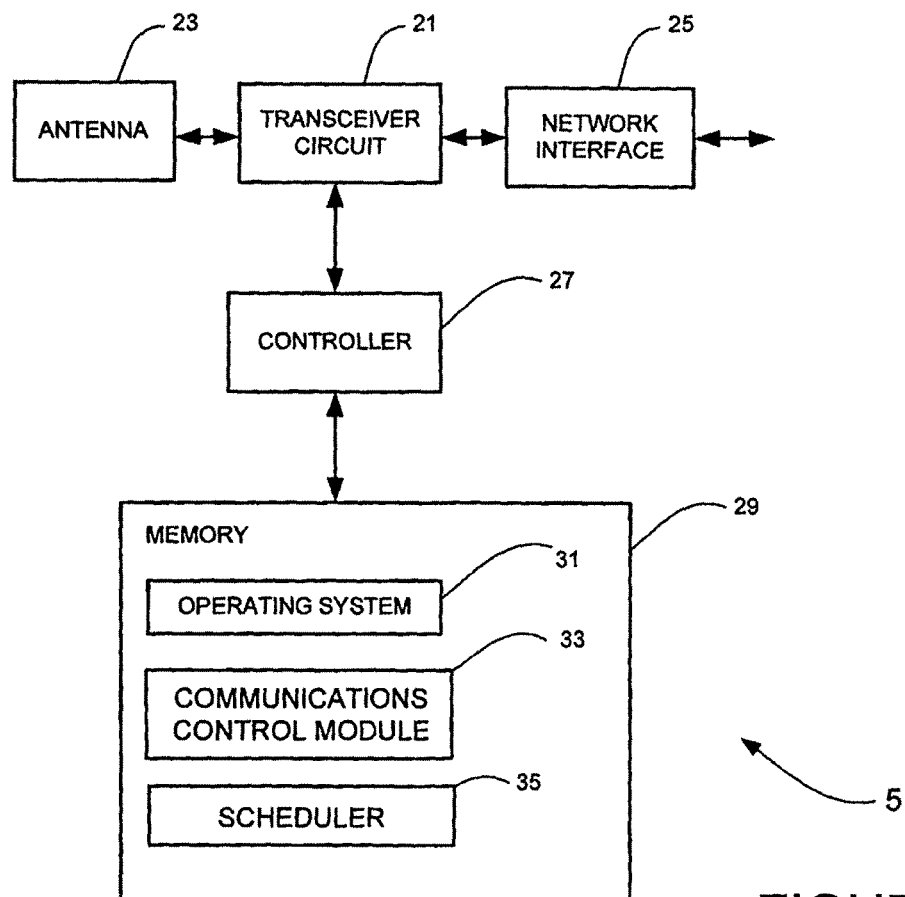
FIG. 3 is a block diagram illustrating the main components of a base station shown in FIG. 1.

FIG. 3 is a block diagram illustrating the main components of the base station 5 used in an exemplary embodiment of the invention. As shown, the base station 5 includes a transceiver circuit 21 which is operable to transmit signals to and to receive signals from the mobile telephones 3 via one or more antennae 23 and which is operable to transmit signals to and to receive signals from the telephone network 7 via a network interface 25. The operation of the transceiver circuit 21 is controlled by a controller 27 in accordance with software stored in a memory 29. The software includes, among other things, an operating system 31, a communications control module 33 and a scheduler 35. The communications control module 31 is operable to control communications between the base station 5 and the mobile telephones 3 and between the base station 5 and the telephone network 7. The scheduler 35 is operable for allocating the resources used by the transceiver circuit 21 in its communications with the mobile telephones 3.

In this exemplary embodiment the scheduler 35 of the base station 5 is configured for allocating consecutive physical resource blocks to a mobile telephone 3 for use in transmitting uplink data from the mobile telephone 3 to the base station 5. The base station scheduler 35 also allocates resources to each mobile telephone 3 for use in transmitting downlink data from the base station 5 to the mobile telephones 3.

General Scheduling Problem

In the general scheduling problem, there is a set of K resources, labelled 0 to K−1, which are to be shared amongst N users (mobile telephones), labelled 0 to N−1. Defining $a_{u,k}$ as a variable such that:

$a_{u,k}=1$ if resource k is allocated to user u $a_{u,k}=0$ otherwise

Usually each resource can be allocated to only one user, so the following constraint applies:

$$\sum_{u=0}^{N-1} a_{u,k} \leq 1 \quad \forall k$$

If ψ(u,k) is a measure of the benefit obtained by assigning resource k to user n, then the general scheduling problem is finding the assignment that maximises the overall benefit:

$$\sum_{u=0}^{N-1}\sum_{k=0}^{K-1} a_{u,k} \psi(u,k)$$

The solution to this is to assign each resource to the user with the maximum value of ψ(u,k) for that resource, i.e. for resource k set $a_{j,k}=1$ where $$j = \underset{0 \leq u < N}{\operatorname{argmax}} \psi(u,k)$$

LTE Uplink Scheduling Problem

In the case of the Long Term Evolution (LTE) of E-UTRAN, the resources that are to be assigned in the uplink are the Physical Resource Blocks (PRBs). In this case K is the total number of PRBs in the system bandwidth (or alternatively, the total number of PRBs available for user data, i.e. excluding those assigned for control channels etc).

In the case of LTE the benefit, or 'scheduling metric', ψ(u,k) is commonly defined as follows:

$$\psi(u,k) = \frac{r_{u,k}}{T_u^\alpha}$$

where $r_{u,k}$ is the instantaneous data rate that mobile telephone u can achieve in PRB k. This is a function of the modulation and coding scheme (MCS) that can be supported by mobile telephone u in PRB k, which is in turn dependent on the instantaneous channel conditions. The channel conditions are typically estimated by measuring the signal to noise+interference ratio (SINR) of a known reference signal (called the Sounding Reference Signal, or SRS) transmitted periodically by the mobile telephone 3. $T_u$ is the average throughput currently being achieved by mobile telephone u, and α is a positive constant (typically between 1.0 and 2.0) which controls the 'fairness' of the scheduler 35.

A scheduler 35 that operates based on the above definition of ψ(u,k), is usually called a Proportional Fair scheduler. Other definitions of ψ(u,k) are of course possible, and the following description is not dependent on any specific definition of ψ(u,k).

The LTE uplink scheduling problem has a number of additional constraints. These are listed below.

1. PRBs allocated to a mobile telephone 3 must be contiguous. This is the so-called 'Single Carrier' constraint which is imposed by the type of modulation employed for the LTE uplink.

2. If the number of PRBs allocated to a mobile telephone 3 is greater than 1 then it must have no factors other than 2, 3 and 5. In other words it must fulfil the following relationship $M_{RB}^{PUSCH}=2^{\alpha_2} \cdot 3^{\alpha_3} \cdot 5^{\alpha_5} \leq N_{RB}^{UL}$ as defined in TS 36.211 Version 8.0.0 section 5.3.3 (the content of which is incorporated herein by reference).

3. A given mobile telephone 3 must employ the same MCS in all PRBs which are allocated to it. This means that the metric ψ(u,k) for some PRB k depends on which other PRBs are allocated to mobile telephone u.

4. In the LTE uplink, slow power control is employed to keep the power received in each PRB close to a target value set by the base station 5. However the mobile telephone 3 has a maximum total transmit power $P_{max}$ that cannot be exceeded. If the number of assigned PRBs is too large, the mobile telephone 3 will be unable to transmit enough power in each PRB to meet the power control target. This is described as 'power clipping'. In the power clipping state, assigning more PRBs to a mobile telephone 3 will not change the total transmitted power but will result in lower power per PRB, and this must be taken into account when selecting the MCS to be assigned to the mobile telephone 3. (When the mobile telephone 3 is not power clipping, assigning further PRBs will increase the total transmitted power but will not change the power per PRB).

5. A mobile telephone 3 should not be allocated more PRBs than it needs to send all the data currently waiting in its queue.

These additional constraints mean that the simple solution used in the general scheduling problem cannot be applied. In fact, the only way to maximize the benefit function $$\sum_{u=0}^{N-1}\sum_{k=0}^{K-1} a_{u,k} \psi(u,k)$$

is by an exhaustive search over all possible allocations, which is prohibitively costly in computational terms. Therefore all practical LTE scheduling algorithms rely on some kind of sub-optimal search strategy which seeks to achieve the best allocation possible with reasonable computational cost. The present invention proposes one such search strategy which is described in the following.

Scheduler Operation

Definitions:

R The set of available PRBs, filled with all PRBs that are available to be assigned by the scheduler 35.

U The set of mobile telephones 3 requesting a new transmission (scheduling of mobile telephones 3 requesting HARQ retransmissions is handled by a separate algorithm).

I(u,i) The set of candidate islands of contiguous PRBs that belong to user mobile telephone u. Initialised to the empty set for all mobile telephones.

$A_u$ The set of PRBs assigned to mobile telephone u. Initialised to the empty set for all mobile telephones.

$A_{u\_temp}$ The set of PRBs temporarily assigned to mobile telephone u. Initialised to the empty set for all mobile telephones.

$TBS_{max}(u,i)$ The maximum Transport Block Size (TBS) that can be allocated for the mobile telephone in a given island.

$TBS_{temp}(PRBs)$ The TBS resulting from assigning a set of PRBs

Figure 4:
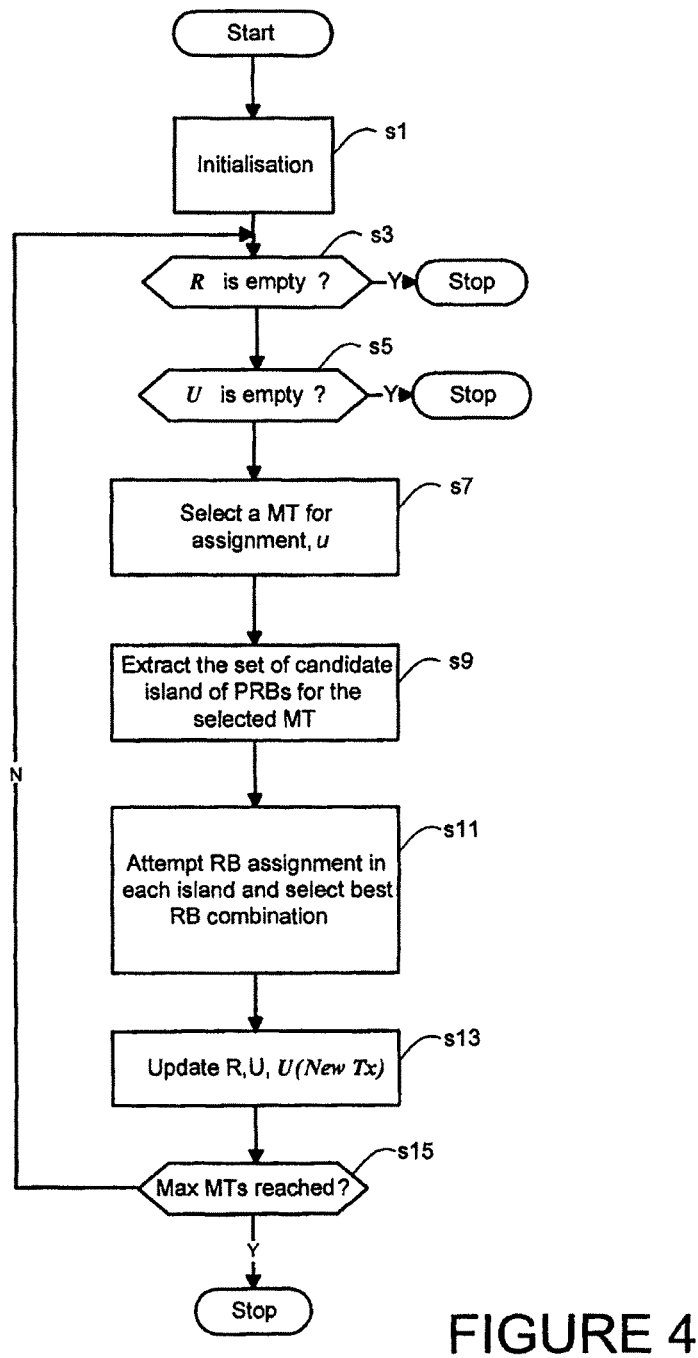
FIG. 4 is a flow chart illustrating the main steps performed by a scheduler forming part of the base station shown in FIG. 3.

SIR(k) The SRS SIR measured for PRB k $N_{users}$ The number of users that have been scheduled FIG. 4 is a flow chart illustrating the processing steps performed by the scheduler 35 shown in FIG. 3. As shown, in step s1 the scheduler 35 initialises the scheduling parameters as follows.

The scheduling metrics ψ(u,k) for each mobile telephone u in each physical resource block (PRB) k are calculated assuming that only PRB k is assigned to mobile telephone u.

R, the set of available PRBs, is filled with all PRBs that are available to be assigned by the scheduler 35.

U, the set of candidate mobile telephones, is initialized with users that have data to be transmitted and requiring dynamic transmission. (A pre-selection algorithm may be applied to reduce the number of candidate users).

$A_u$, the set of PRBs assigned to mobile telephone u, is initialised to the empty set for all mobile telephones.

Then in step s3 the scheduler 35 checks that the set of available PRBs (R) is not empty. If it is then the processing stops, otherwise the scheduler 35 checks, in step s5, if the set of candidate mobile telephones (U) is empty. If it is then the processing stops, otherwise the scheduler 35 proceeds to step s7, where the scheduler 35 selects a mobile telephone (MT) for allocation. The scheduler 35 does this firstly by finding, for each PRB k that is not allocated, the mobile telephone with the best metric ψ(u,k) in this PRB.

$$\psi_{max}(k) = \max_{u \in U}(\psi(u, k)) \quad k \in R$$

Figure 5:
FIG. 5 illustrates groups or islands of resource blocks associated with different mobile telephones.

The scheduler 35 then identifies the blocks of contiguous PRBs in which a given mobile telephone has a higher metric than all other mobile telephones. Each block or group of contiguous PRBs is referred to in the following description as an 'island'. A mobile telephone may have more than one island. In the example shown in FIG. 5, mobile telephone 3-0 has two islands whilst mobile telephones 3-1 and 3-2 have one island. The scheduler 35 then calculates, for each island (i), the sum of the scheduling metric over all PRBs in the island:

$$u(i) = \sum_{k \in I_u} \psi(i, k)$$

Finally, in step s7 the scheduler 35 selects the island with the largest value of μ(i), and selects the corresponding mobile telephone $u_0$ to be scheduled for allocation.

In step s9 the scheduler 35 extracts the islands belonging to the selected mobile telephone $u_0$. At this point, the islands may optionally be expanded by appending more PRBs at the edges. In step s11 the scheduler 35 goes through each island that belongs to the selected user $u_0$ and finds the PRB combination within the island that either maximizes the TBS (Transport Block Size) or empties the user's queue with the fewest possible PRBs. This is the PRB allocation that is assigned for the selected mobile telephone.

The TBS is a function of the number of assigned PRBs and the MCS that can be supported in those PRBs. The exact method for selecting the MCS may vary, but typically it involves finding an 'effective SINR' for the assigned block of PRBs by combining the SIR measurements from each of the PRBs in the block. This effective SINR is then compared to a set of thresholds to select the appropriate MCS, which is identified by an MCS index. If the effective SINR is below the lowest threshold (meaning that even the most robust MCS cannot be supported), then the MCS index may be set to −1 to indicate that the corresponding PRB assignment should be avoided. Once the MCS index is found, the TBS can be obtained as described in 3GPP TS 36.213 Version 8.8.0 section 7.1.7.2.1. If the MCS index is −1 then the TBS can be set to 0.

In step s13, the scheduler 35 updates R, U and $N_{users}$. In particular the scheduler 35 removes the selected mobile telephone from the candidates (U); removes the PRBs that have been allocated to the selected mobile telephone from the set of possible PRBs (R); and adds one to the number of mobile telephones scheduled for transmission ($N_{users}$). The scheduler 35 then checks in step s15 if the maximum number of mobile telephones has been allocated resources (by comparing $N_{users}$ with a threshold). If the maximum number has not been reached, then the processing returns to step s3 where the above process is repeated.

Figure 6:
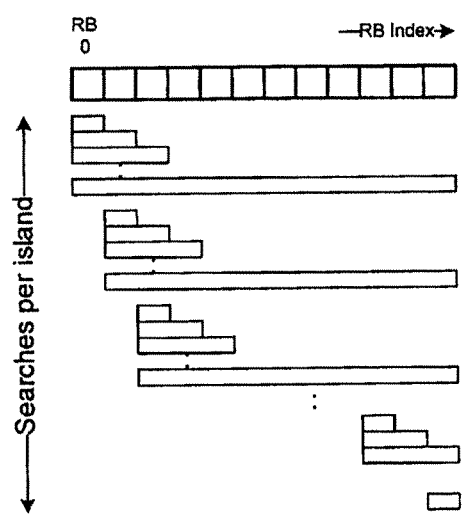
FIG. 6 illustrates an exhaustive search of islands for a combination of resource blocks that can be used to provide the uplink for a mobile telephone.

As mentioned above, ideally at step s11 the scheduler 35 will test every possible PRB assignment within a given island (as schematically illustrated in FIG. 6), in order to find the PRB combination that either maximizes the TBS or empties the user's data queue with the fewest number of PRBs. However the complexity of such a method is not suitable for implementation because of the large number of possible PRB combinations to be tested. An alternative method is described here which is more suitable for practical implementation.

Figure 7:
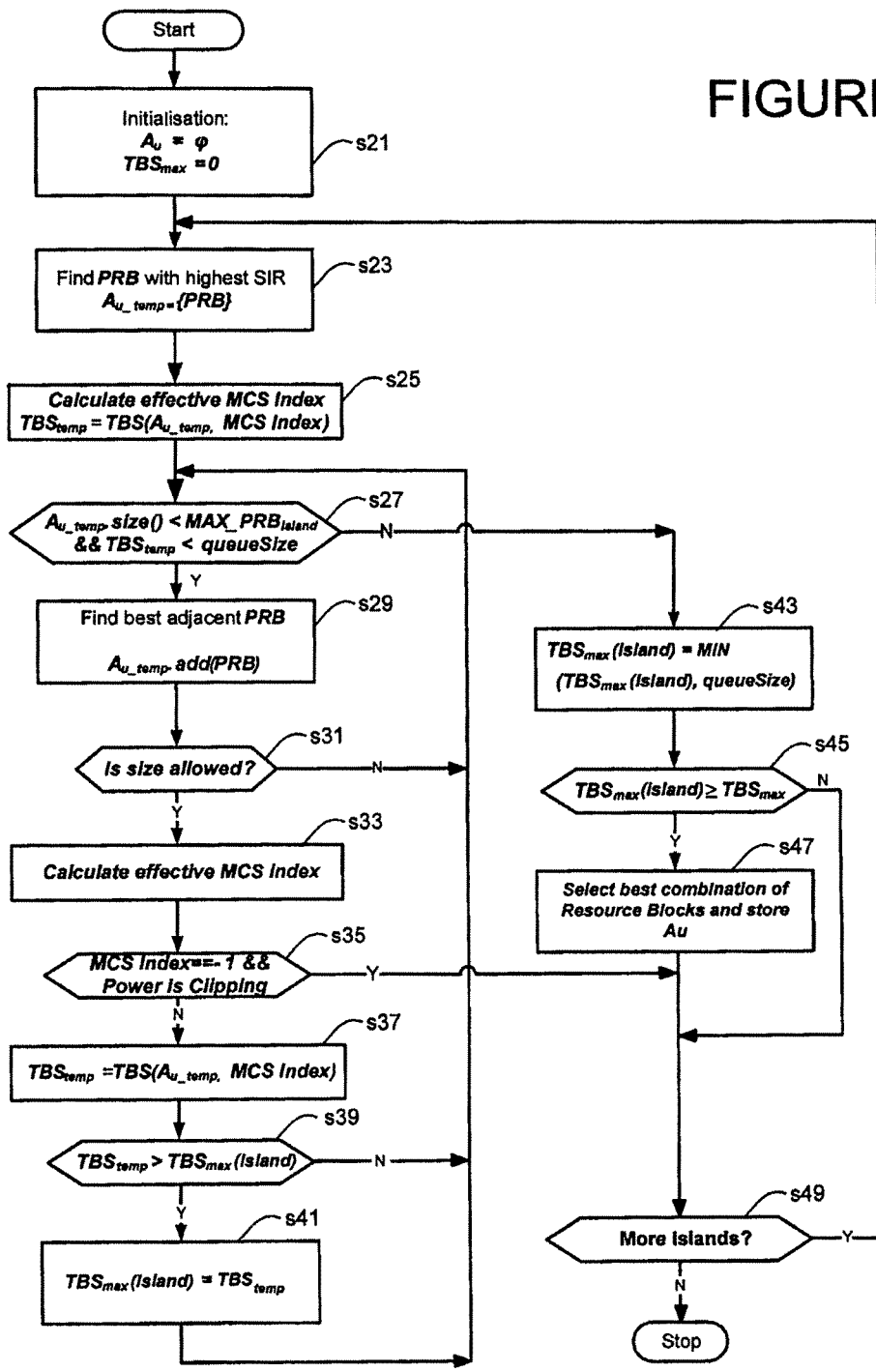
FIG. 7 is a flow chart illustrating a search strategy embodying the invention to identify a set of resource blocks that can be used to provide the uplink for a mobile telephone.

The method performed by the scheduler 35 in this exemplary embodiment is illustrated in FIG. 7 and is performed for each island that belongs to the selected mobile telephone ($u_0$). The objective of the method is to try to find the set of PRBs that maximize the TBS.

Figure 8:
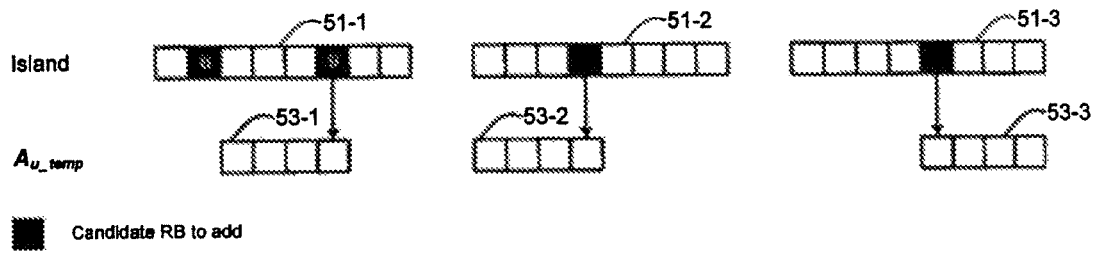
FIG. 8 illustrates the way in which a candidate set of resource blocks can be expanded to identify the resources to be used for the uplink for a mobile telephone.

Initially at step s21 the scheduler 35 initialises set $A_u$ to the empty set and initialises $TBS_{max}$ to 0. Then in step s23 the scheduler 35 finds the PRB with the highest SIR value within the current island being processed. The scheduler 35 then initialises $A_{u\_temp}$ to contain only this PRB (i.e. the one with the highest SIR value). In step s25 the scheduler 35 calculates the effective MCS Index and the resulting TBS, and stores this value in $TBS_{temp}$. In step s27 the scheduler 35 checks to see if the number of PRBs in $A_{u\_temp}$ is less than the maximum number of PRBs in the island AND the current $TBS_{temp}$ is less than the queue size (i.e. the amount of data to be transmitted by the mobile telephone in the uplink). If this condition is met, then the processing proceeds to step s29, otherwise the processing proceeds to step s43 which will be described below. In step s29, the scheduler 35 finds the best adjacent PRB to the set in $A_{u\_temp}$. This is done by comparing the SIR for the PRB to the left and to the right of the set of PRBs in $A_{u\_temp}$ and selecting the one with the highest SIR. Note that it is possible the PRBs in $A_{u\_temp}$ can be on the edge of an island, hence there is only one candidate PRB which will then be selected. The selected PRB is added to $A_{u\_temp}$. The processing performed in step s29 is illustrated in FIG. 8, which shows three different islands 51-1, 51-2 and 51-3 and below each island 51, the current PRBs in the set $A_{u\_temp}$ labelled as 53-1, 53-2 and 53-3 respectively. The candidate PRBs to the left and right of those in the set $A_{u\_temp}$ are shaded. In the case of island 51-1, there are two possible PRBs and the one with the highest SIR is selected (in the example the right hand one) and added to the set $A_{u\_temp}$ (as represented by the arrow). For islands 51-2 and 51-3, the PRBs in $A_{u\_temp}$ are on the edge of the corresponding island, so the right hand PRB in the case of island 51-2 is added to the set $A_{u\_temp}$ and the left hand PRB in the case of island 51-3 is added to the set $A_{u\_temp}$.

Following step s29, the scheduler 35 checks, in step s31, if the size of $A_{u\_temp}$ is allowed—that the number of PRBs in $A_{u\_temp}$ does not have any factors other than 2, 3 and 5 (i.e. it satisfies the $M_{RB}^{PUSCH} = 2^{\alpha_2} \cdot 3^{\alpha_3} \cdot 5^{\alpha_5} \leq N_{RB}^{UL}$ rule). If it is not allowed then the processing returns to step s27 discussed above. Otherwise, the processing continues to step s33, where the scheduler 35 calculates the effective MCS index for the PRBs in the set $A_{u\_temp}$. If the MCS index is equal to −1 and power is clipping (i.e. the mobile telephone power>$P_{max}$) in step s35, then the processing for the current island ends and the scheduler 35 proceeds to step s49 to consider the next island. Otherwise, the scheduler 35 finds, in step s37, the resulting $TBS_{temp}$ for the calculated MCS Index and PRBs in $A_{u\_temp}$. Noting, however, that an MCS Index=−1 results in TBS=0.

In step s39 the scheduler 35 determines if the thus determined value of $TBS_{temp}$ is greater than the previously obtained maximum value of TBS for the current island (i.e. $TBS_{max}$(Island)). If it is then the scheduler 35 updates $TBS_{max}$(Island) in step s41 before then returning to step s27. In step s27, once there are no more PRBs left in the island or once $TBS_{temp}$ is sufficient to transmit the uplink data in the queue, the processing proceeds to step s43, where the maximum value of TBS obtained for the current island ($TBS_{max}$(Island)) is reduced to the queue size if it is greater than the queue size. The processing then proceeds to step s45, where the scheduler 35 determines if the value of $TBS_{max}$(Island) is greater than or equal to the maximum TBS ($TBS_{max}$) obtained from other islands associated with the same mobile telephone 3. If it is not, then the processing proceeds to step s49 to consider the next island. If it is, then the processing proceeds to step s47. If $TBS_{max}$(Island) is greater than the maximum TBS ($TBS_{max}$), update ($A_u$) with the combination of PRBs in $A_{u\_temp}$, otherwise the scheduler 35 considers if the combination of PRBs in $A_{u\_temp}$ for the current island is better than the combination of PRBs obtained thus far ($A_u$) for the current mobile telephone 3. In this exemplary embodiment, the best combination of PRBs is the one with the fewest PRBs and if they have the same number of PRBs then the combination of PRBs with the highest effective SIR. If the combination of PRBs in $A_{u\_temp}$ for the current island is better, then $A_u$ is set as $A_{u\_temp}$ otherwise no change is made and the processing continues to step s49 for consideration of the next island. Once all the islands for a given mobile telephone have been processed in the above manner, the scheduler 35 will have identified in the set $A_u$ the PRBs to be assigned to the mobile telephone $u_0$. The processing can then be repeated for the next mobile telephone.

Figure 9:
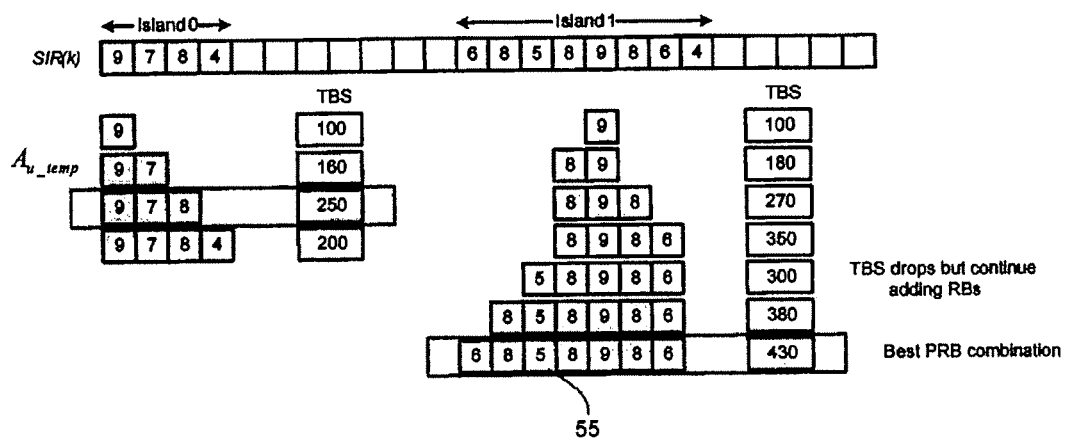
FIG. 9 illustrates how the process performed by the scheduler operates in an example.

FIG. 9 illustrates an example of the above processing, where the SIR for each PRB is defined by a number contained within a box representing the PRB. Thus, in the illustrated example, the currently selected mobile telephone has two islands (labelled Island 0 and Island 1) and has a queue size of 400 bytes. FIG. 9 shows the determined TBS for each set of $A_{u\_temp}$ as it is built up using the above procedure. As can be seen from FIG. 9, Island 0 can support a maximum TBS of 250 bytes while Island 1 can support a maximum TBS of 430 bytes which is sufficient to empty the queue; thus this PRB combination (labelled as 55 in FIG. 9) is selected.

Note that it is possible that the determined TBS may drop as a result of adding a 'weak' PRB. However the search should continue by adding more PRBs because the TBS may increase again. This is also illustrated in FIG. 9 for Island 0 when the TBS reduces from 250 to 200 when the final PRB is added to $A_{u\_temp}$; and for Island 1 when the TBS drops from 350 to 300 when the PRB with an SIR of 5 is added to $A_{u\_temp}$.

Mobile Telephone

Figure 10:
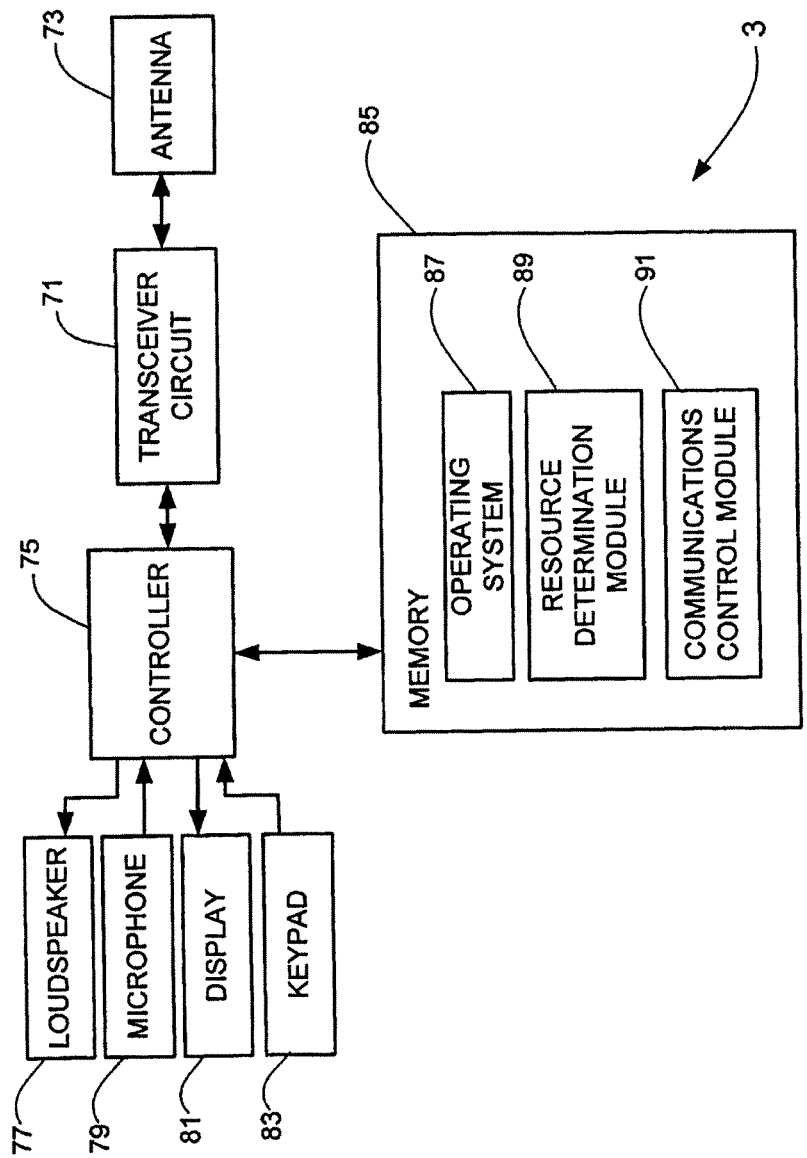
FIG. 10 is a block diagram illustrating the main components of a mobile telephone shown in FIG. 1.

FIG. 10 schematically illustrates the main components of each of the mobile telephones 3 shown in FIG. 1. As shown, the mobile telephones 3 include a transceiver circuit 71 which is operable to transmit signals to and to receive signals from the base station 5 via one or more antennae 73. As shown, the mobile telephone 3 also includes a controller 75 which controls the operation of the mobile telephone 3 and which is connected to the transceiver circuit 71 and to a loudspeaker 77, a microphone 79, a display 81, and a keypad 83. The controller 75 operates in accordance with software instructions stored within a memory 85. As shown, these software instructions include, among other things, an operating system 87, a resource determination module 89 and a communications control module 91. The resource determination module 89 is operable to decode the resource allocation data signalled from the base station 5 to determine that mobile telephone's physical resource block allocation for both the uplink and the downlink and the communications control module is operable to control communications with the base station 5 using the resources allocated by the base station 5.

Modifications and Alternatives

A detailed embodiment has been described above. As those skilled in the art will appreciate, a number of modifications and alternatives can be made to the above exemplary embodiment whilst still benefiting from the inventions embodied therein. By way of illustration only a number of these alternatives and modifications will now be described.

In the above exemplary embodiments, a mobile telephone based telecommunication system was described in which the above described resource allocation techniques were employed. As those skilled in the art will appreciate, the techniques for scheduling resources for such communications can be employed in any communication system that uses a plurality of resource blocks. In the general case, the base station would be replaced by a communication node which communicates with a number of different user devices. For example, while the term 'mobile telephone' has been used throughout the description the methods and apparatus described are equally applicable to any communication user device, for example, a personal digital assistant, a laptop computer, a web browser, etc.

In the above exemplary embodiments, the base station was assumed to have an operating bandwidth of 20 MHz and each resource block included 12 sub-carriers. As those skilled in the art will appreciate, the invention is not limited to this particular size of bandwidth or resource block size or to the frequency spacing of the sub-carriers described.

In the above exemplary embodiments, the scheduler identified the resource block having the best SIR value in the island as the starting point for the potential set of resource blocks ($A_{u\_temp}$). As those skilled in the art will appreciate, in some embodiments it is not essential to start with the resource block having the best SIR (or other scheduling metric). For example, the block having the second or third best scheduling metric could be used as the starting point.

In the above exemplary embodiment, the base station processed all groups (or islands) of resource blocks that were associated with the selected user device (mobile telephone) and selected the best set of resource blocks for allocation to the user device. In an alternative exemplary embodiment, the base station may simply process the groups in sequence stopping once a set of resource blocks has been identified that can provide the required communication capability.

In the above exemplary embodiments, a number of software modules were described. As those skilled will appreciate, the software modules may be provided in compiled or un-compiled form and may be supplied to the base station or to the mobile telephone as a signal over a computer network, or on a recording medium. Further, the functionality performed by part or all of this software may be performed using one or more dedicated hardware circuits. However, the use of software modules is preferred as it facilitates the updating of base station 5 and the mobile telephones 3 in order to update their functionalities. Further, the modules described above may not be defined as separate modules and may instead be built in to the operating system of the base station and/or the mobile telephone.

This application is based upon and claims the benefit of priority from United Kingdom Patent application No. 0922515.2, filed on Dec. 23, 2009, the disclosure of which is incorporated herein in its entirety by reference.

The invention claimed is:

1. A method of determining a resource allocation from a set of resource blocks for a selected one of a plurality of user devices in a communications system, the method comprising:
   obtaining, for each user device, a scheduling metric for each resource block;
   grouping the resource blocks into groups based on the obtained scheduling metrics, each group being associated with a user device;
   determining the resource allocation for the selected user device using the resource blocks within a selected group of resource blocks associated with the selected user device,
the determining of the resource allocation comprising:
   identifying an initial resource block from the selected group, which initial resource block has a better scheduling metric than other resource blocks in the selected group;
   adding the initial resource block to a temporary set of resource blocks; and
   iteratively processing the resource blocks in the selected group by:
      selecting a resource block from the resource blocks within the selected group that is adjacent to the resource blocks in the temporary set of resource blocks and that has the best scheduling metric;
      adding the selected resource block to the temporary set of resource blocks; and
      determining if the resource blocks in the temporary set of resource blocks can meet a communications requirement for the user device; and
   performing the identifying of the initial resource block, the adding of the initial resource block and the iterative processing of the resource blocks to:
      process another group of resource blocks associated with the selected user device; and
      process each group of resource blocks associated with the selected user device and select a temporary set of resource blocks for allocation to the user device based on the temporary sets of resource blocks derived during the processing of the groups of resource blocks associated with the user device,
   wherein the selected temporary set of resource blocks is selected based on the set of resource blocks that can meet the communications requirement of the user device, in which the temporary set of resource blocks using the fewest resource blocks is selected.

2. A method according to claim 1, wherein said iterative processing is performed on the selected group until the iterative processing determines that the resource blocks in the temporary set of resource blocks can meet said communications requirement for the user device or until there are no more resource blocks within the selected group or until the number of resource blocks in the temporary set is greater than a maximum allowed number of resource blocks in an allocation.

3. A non-transitory computer readable recording medium comprising computer implementable instructions for causing a programmable computer device to perform the method of claim 1.

4. A method according to claim 1, wherein said iterative processing is performed on the selected group until the determining step determines that the resource blocks in the temporary set of resource blocks can meet said communications requirement for the user device or until there are no more resource blocks within the selected group or until the number of resource blocks in the temporary set is greater than a maximum allowed number of resource blocks in an allocation.

5. A method according to claim 1, wherein said iterative processing is performed on the selected group until the determining step determines that the resource blocks in the temporary set of resource blocks can meet said communications requirement for the user device or until there are no more resource blocks within the selected group or until the number of resource blocks in the temporary set is greater than a maximum allowed number of resource blocks in an allocation.

6. A communications device operable to determine a resource allocation from a set of resource blocks for a selected one of a plurality of user devices in a communications system, the communications device comprising:
   means for obtaining, for each user device, a scheduling metric for each resource block;
   means for grouping the resource blocks into groups based on the obtained scheduling metrics, each group being associated with a user device; and
   means for determining the resource allocation for the selected user device using the resource blocks within a selected group of resource blocks associated with the selected user device the determining means comprising:
      identifying means for identifying an initial resource block from the selected group, which initial resource block has a better scheduling metric than other resource blocks in the selected group;
      adding means for adding the initial resource block to a temporary set of resource blocks; and
      iterative processing means for iteratively processing the resource blocks in the selected group by:
         selecting a resource block from the resource blocks within the selected group that is adjacent to the resource blocks in the temporary set of resource blocks and that has the best scheduling metric;
         adding the selected resource block to the temporary set of resource blocks; and
         determining if the resource blocks in the temporary set of resource blocks can meet a communications requirement for the user device;
   wherein the identifying means, the adding means and the iterative processing means: process another group of resource blocks associated with the selected user device; and
   process each group of resource blocks associated with the selected user device and select a temporary set of resource blocks for allocation to the user device based on the temporary sets of resource blocks derived during the processing of the groups of resource blocks associated with the user device,
   wherein the selected temporary set of resource blocks is selected based on the set of resource blocks that can meet the communications requirement of the user device, in which the temporary set of resource blocks using the fewest resource blocks is selected.

7. A communications device according to claim 6, wherein said iterative processing means is operable to perform the iterative processing on the selected group until the determining means determines that the resource blocks in the temporary set of resource blocks can meet said communications requirement for the user device or until there are no more resource blocks within the selected group or until the number of resource blocks in the temporary set is greater than a maximum allowed number of resource blocks in an allocation.

8. A communications device according to claim 6, wherein the communications device comprises a base station of a telecommunications network.

9. A communications system comprising:
a plurality of user devices; and
the communications device according to claim 8, the base station being operable to determine resource allocations for each of said user devices, and the plurality of user devices being operable to communicate with the base station using the resources allocated by the base station.

10. A communications device according to claim 6, wherein said iterative processing means is operable to perform the iterative processing on the selected group until the determining means determines that the resource blocks in the temporary set of resource blocks can meet said communications requirement for the user device or until there are no more resource blocks within the selected group or until the number of resource blocks in the temporary set is greater than a maximum allowed number of resource blocks in an allocation.

* * * * *